United States Patent
Long et al.

(10) Patent No.: US 9,253,998 B2
(45) Date of Patent: Feb. 9, 2016

(54) MATERIAL CONTAINER FOR ULTRA-HIGH PRESSURE FOOD PROCESSING

(75) Inventors: Peter James Maxwell Long, Shanghai (CN); Guangming Su, Hangzhou (CN)

(73) Assignee: CHIC Foods Technology Co., LTD, Shanghai (CN)

(*) Notice: Subject to any disclaimer, the term of this patent is extended or adjusted under 35 U.S.C. 154(b) by 778 days.

(21) Appl. No.: 13/565,810

(22) Filed: Aug. 3, 2012

(65) Prior Publication Data
US 2013/0037548 A1 Feb. 14, 2013

(30) Foreign Application Priority Data

Aug. 12, 2011 (CN) ...................... 2011 2 0292310 U

(51) Int. Cl.
*A23L 3/00* (2006.01)
*A23L 3/015* (2006.01)

(52) U.S. Cl.
CPC .............. *A23L 3/001* (2013.01); *A23L 3/0155* (2013.01)

(58) Field of Classification Search
CPC ........ B65D 55/00; B65D 55/12; B65D 55/14; B65D 55/16; B65D 55/18; A23L 4/00; A23L 4/005; A23L 4/0053
USPC ......... 220/500, 503, 504, 506, 507, 509, 510, 220/523, 528, 529, 534, 549, 553, 554, 220/557; 426/399, 407, 521; 206/261
See application file for complete search history.

(56) References Cited

U.S. PATENT DOCUMENTS

| | | | | |
|---|---|---|---|---|
| 1,349,716 A * | 8/1920 | Elliot | | 222/142.3 |
| 3,485,416 A * | 12/1969 | Fohrman | | 222/142.1 |
| 4,184,590 A * | 1/1980 | Tenbrink, Sr. | | 206/0.82 |
| 5,762,199 A * | 6/1998 | Aguilera | | 206/533 |
| 5,967,315 A * | 10/1999 | Langtry, II | | 206/315.11 |
| 2003/0192895 A1* | 10/2003 | Pfister et al. | | 220/507 |
| 2008/0314778 A1* | 12/2008 | Hatton | | 206/256 |

* cited by examiner

*Primary Examiner* — Steven A. Reynolds
*Assistant Examiner* — Javier A Pagan
(74) *Attorney, Agent, or Firm* — Treasure IP Group, LLC

(57) ABSTRACT

The material container disclosed in present application, comprises a cylindrical body with end covers attached to its ends. Multiple holes are distributed across the end covers. A movable sliding rack is located inside the cylindrical body. The axial direction of movable sliding rack coincides with the axial direction of the cylindrical body. The movable sliding rack has at least two hollow columns which axis is in the same direction of the axis of movable sliding rack. Any two neighboring hollow columns are isolated by their walls. Water can be timely added into the cylindrical body through the holes, without damaging material container due to water pressure. Turning around one end cover allows the cylindrical body to be opened for food materials conveniently loading or unloading. It provides quicker loading and unloading for cup or bottle packed materials with the movable sliding rack, utilizing the space inside the cylindrical body efficiently.

4 Claims, 2 Drawing Sheets

MATERIAL CONTAINER FOR ULTRA-HIGH PRESSURE FOOD PROCESSING

CROSS-REFERENCE TO RELATED APPLICATION

This application claims priority to Chinese Application No. 201120292310.7, filed on Aug. 12, 2011. The Chinese Application is incorporated herein by reference in its entirety.

FIELD OF THE INVENTION

The present invention relates to the field of packaging and delivery, in particular to food processing equipment, specifically to a material container for ultra-high pressure food processing.

BACKGROUND OF THE INVENTION

Ultra-high pressure food processing is referred to after placing food in a container, then placing the container in an ultra-high pressure food processing chamber, filling up the chamber with liquid usually with water continuously to make the pressure inside the chamber reach above 100 MPa, usually 6000 atmosphere pressure, to kill the bacteria in the food. The material container disclosed in the prior art is a simple frame, which can not utilize the most of its inner space for placing food, and the process of placing food is time consuming, labor intensive, and not suitable for in-line operation. In addition, the material container disclosed in the prior art bears low pressure only and it is likely to be damaged.

SUMMARY OF THE INVENTION

The purpose of the present invention is to disclose a material container that is suitable for ultra high pressure food processing. Said material container for ultra high pressure food processing is aimed to solve the problems described in the existing technology. For example, the space in the existing material containers can not be utilized effectively for placing food. It is inconvenient for transferring materials in and out of the containers. The existing material containers are not strong enough to bear pressure and they are likely to be damaged.

The material container disclosed in the present application, comprises a cylindrical body which has a window in its side wall, and the window is utilized for putting materials in and taking materials out of the cylindrical body. A first end cover is fixed on one end of the cylindrical body and a second end cover is located on the other end of the cylindrical body. Said second end cover is attached to the cylindrical body by screws. Two or more fluid passage holes are distributed across each end cover respectively. A movable sliding rack is located inside the cylindrical body. The axial direction of said movable sliding rack coincides with the axial direction of the cylindrical body. The movable sliding rack has at least two hollow columns. The axis of any of said hollow columns is in the same direction of the axis of the movable sliding rack. Any two of the neighboring hollow columns are isolated by their wall/walls.

Further, said movable sliding rack includes a center cylindrical tube and six specially sectioned cylindrical tubes. Any one of said specially sectioned cylindrical tubes is comprised of a cylindrical tube having an opening on its wall and the said opening is parallel to the axis of the said cylindrical tube. Said center cylindrical tube is located inside the moveable sliding racking, sharing the same axis with the moveable sliding racking. Said center cylindrical tube is surrounded by the said specially sectioned cylindrical tubes on the periphery, and tangent to the outer wall of each said specially sectioned cylindrical tube. The outer walls of any two neighboring specially sectioned cylindrical tubes are tangent to each other.

Further, both of the first end cover and the second end cover respectively have a carrying handle attached.

Further, in the first end cover, the distribution density of the fluid passage holes increases from the left side of the first end cover to the right side of the first end cover. And in the second end cover, the distribution density of the fluid passage holes increases from the left side of the second end cover to the right side of the second end cover.

The working principle of the present invention is the following. The first end cover and the second end cover have fluid passage holes, which are distributed throughout the first and second end covers. The fluidic passage holes allow water to be added into the cylindrical body in a timely manner. Water leveling at any height along the diameter direction of the cylindrical body can reach into the fluidic passage holes, avoiding damaging on the material container due to the water pressure on the end covers. One end cover is fixed on the cylindrical body and the other end cover can be turned around while it is attached to the cylindrical body by just one screw. By this mechanism, one end of the cylindrical body can be opened for conveniently loading or unloading the materials to be processed, saving time and labor. In one example of the present invention, when processing cup or bottle packed materials, the movable sliding rack is first placed into the cylindrical body, then cup or bottle packed materials are placed into the movable sliding rack. By doing so, the materials can be uploaded or unloaded more quickly and the space inside the cylindrical body can be more effectively utilized than placing the materials inside randomly. In another example of the present invention, when processing bag packed or irregular-shape packed materials, the movable sliding rack can be taken out of the cylindrical body, allowing materials to be placed directly inside the cylindrical body for processing.

Comparing the present invention with existing technology, the material container disclosed in the present invention has positive and obvious advantages. The end covers have multiple fluidic passage holes distributed throughout, which allow water to be timely added into the cylindrical body. Water leveling at any height along the radial direction of the cylindrical body can reach into the fluidic passage holes, avoiding damaging the material container caused by the water pressure on the end covers. Having one end cover fixed onto the cylindrical body, whereas the other end cover can be turned around while being attaching to the cylindrical body with just one screw, making one end of the cylindrical body open, which is more convenient for material loading and unloading, saving time and labor. When cup or bottle packed materials need to be processed, first placing the movable sliding rack inside the cylindrical body and then placing the material into the movable sliding rack, which provides quicker loading and unloading materials. Moreover the space inside the cylindrical body can be utilized more efficiently than placing the materials in randomly. When processing bag packed materials or materials packed in irregular shapes, the movable sliding rack can be taken out from the cylindrical body, and the material can be placed into the cylindrical body directly for processing.

DETAILED DESCRIPTION OF THE PREFERRED EMBODIMENTS

Embodiment 1

Figure 1:
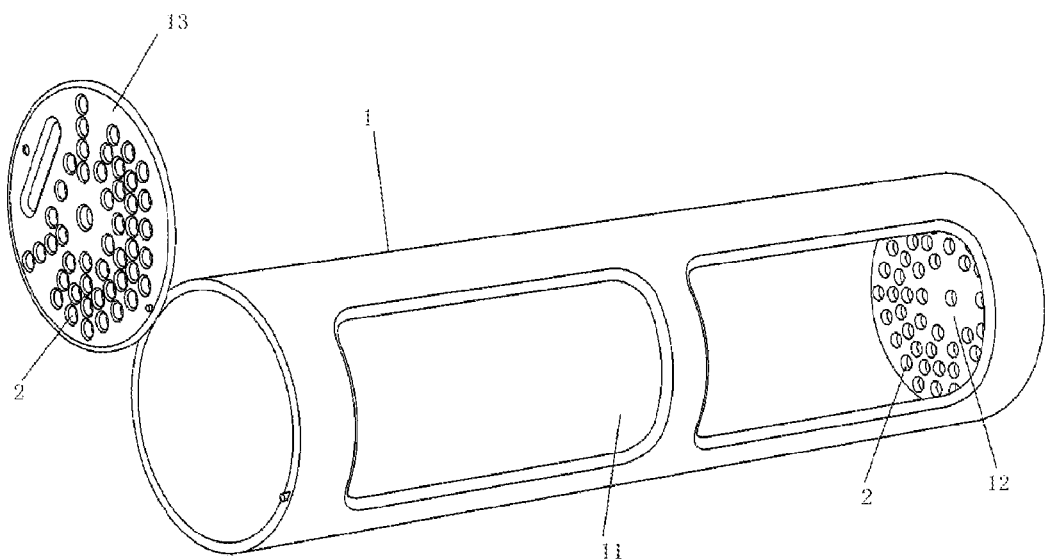
FIG. 1 is a schematic illustration of the cylindrical body in the material container for ultra-high food processing in accordance with the aspects of the present invention.
Figure 2:
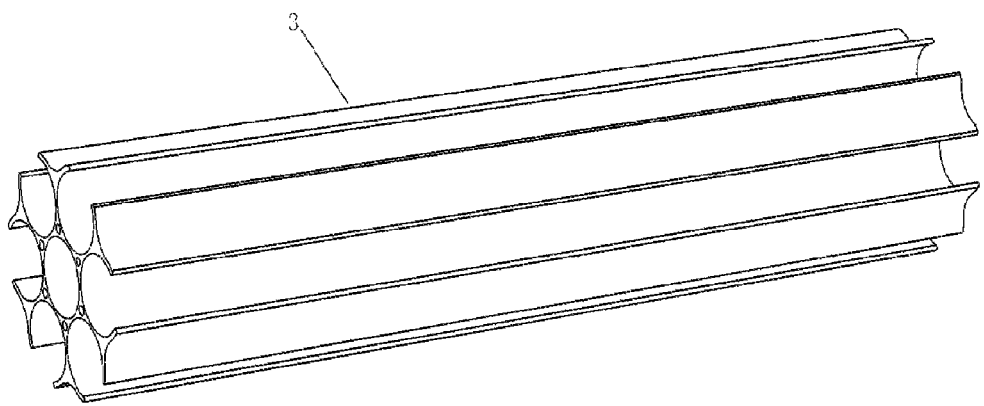
FIG. 2 is a schematic illustration of the movable sliding rack in the material container for ultra-high food processing in accordance with the aspects of the present invention.
Figure 3:
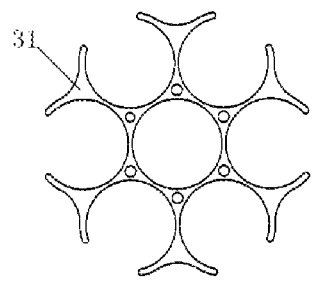
FIG. 3 is a schematic illustration of the cross section along the radial direction of the movable sliding rack in the material container for ultra-high food processing in accordance with the aspects of the present invention.
Figure 4:
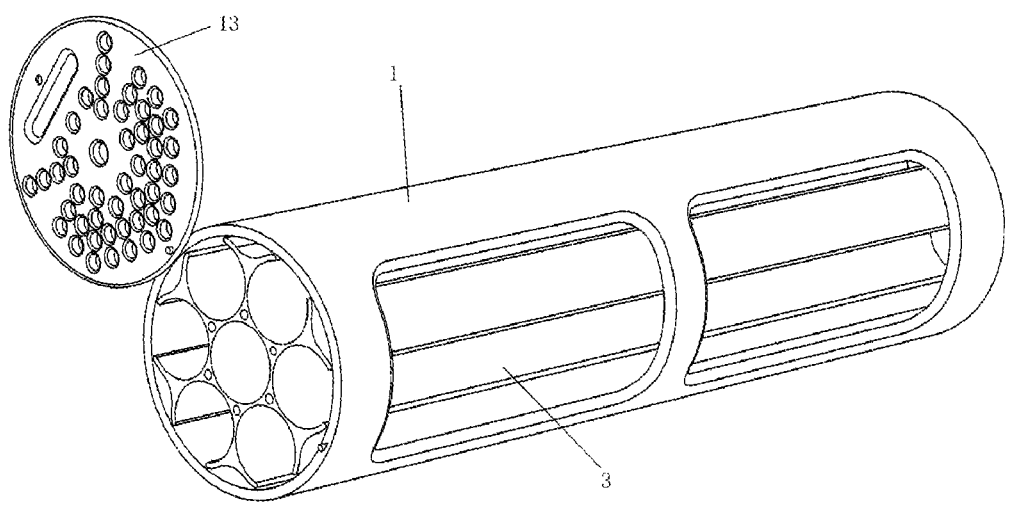
FIG. 4 is a schematic illustration of the material container for ultra-high food processing after being assembled, in accordance with the aspects of the present invention.

As FIGS. 1-4 illustrate, the material container according to the aspects of the present invention, comprises a cylindrical body 1. An opening 11, for putting in or taking out materials, is located in the side wall of said cylindrical body 1. In the present invention, a first end cover 12 is fixed on one end of said cylindrical body 1. A second end cover 13 is located on the other end of the cylindrical body 1. The second end cover 13 is attached to the end surface of the cylindrical body 1 by a pair of screws. (Two or more fluid passage holes 2 are distributed across the first end cover 12. Two or more fluid passage holes 2 are distributed across the second end cover 13. Inside cylindrical body 1 there is a movable sliding rack 3. The axis of the movable sliding rack 3 coincides with the axis of cylindrical body 1. The movable sliding rack 3 has at least two hollow columns. The axial direction of any of said hollow columns is in the same direction with the axial direction of the movable sliding rack 3. Any two of the neighboring hollow columns are isolated by their wall/walls.

Further, said movable sliding rack 3 has a center cylindrical tube and six specially sectioned cylindrical tubes. Any one of said specially sectioned cylindrical tubes is comprised of a cylindrical tube having an opening on its wall and the said opening is parallel to the axis of the said cylindrical tube. Said center cylindrical tube is located inside the movable sliding racking 3, sharing the same axis with the movable sliding racking 3. Said center cylindrical tube is surrounded by the said specially sectioned cylindrical tubes on the periphery, and tangent to the outer wall of the each said specially sectioned cylindrical tube. The outer walls 31 of any of the two neighboring specially sectioned cylindrical tubes are tangent to each other.

Further, both of the first and second end covers 12 and 13, respectively, have a carrying handle attached.

Further, in the first end cover 12, the distribution density of the fluid passage holes 2 increases from the left side of the first periphery end cover 12 to the right side of the first end cover 12. And in the second end cover 13, the distribution density of the fluid passage holes 2 increases from the left side of the second end cover 13 to the right side of the second end cover 13.

The working principle of the present invention is the following. The first and second end covers 12 and 13 have fluid passage holes 2, which are distributed throughout the first and second end covers 12 and 13. The fluid passage holes 2 allow water to be added into the cylindrical body 1 in a timely manner. Water leveling at any height along the radial direction of the cylindrical body 1 can reach into the fluid passage holes 2, avoiding damaging the material container due to the water pressure on the end covers. One end cover is fixed on the cylindrical body 1 and the other end cover can be turned around while it is attached to the cylindrical body 1 by just one screw. By this mechanism, one end of the cylindrical body can be opened for conveniently loading or unloading the materials to be processed, saving time and labor. In one example of the present invention, when processing a cup or bottle packed materials, the movable sliding rack 3 is first placed into the cylindrical body 1, then cup or bottle packed materials are placed into the movable sliding rack 3. By doing so, the materials can be uploaded or unloaded more quickly and the space inside the cylindrical body 1 can be more effectively utilized than placing the materials inside randomly. In another example of the present invention, when processing bag packed or irregular-shape packed materials, the movable sliding rack 3 can be taken out of the cylindrical body 1, allowing materials to be placed directly inside the cylindrical body 1 for processing.

What is claimed is:

1. A material container for ultra high pressure food processing, comprising
   a cylindrical body, having a window in its side wall for placing and taking out materials;
   a first end cover, being fixed on one end of the cylindrical body, and can be turned around while it is attached to the cylindrical body by just one screw;
   a second end cover, located on the other end of the cylindrical body, wherein the second cover is attached to the end of the cylindrical body on the surface using a pair of screws;
   two or more fluid passage holes, distributed across each of the end covers respectively;
   wherein the fluid passage holes allow water to be added into the cylindrical body in a timely manner, avoiding damaging on the material container due to the water pressure on the end covers;
   a movable sliding rack, located inside the cylindrical body, wherein the axial direction of said movable sliding rack coincides with the axial direction of the cylindrical body; and
   at least two columns on the movable sliding rack, wherein the axis of any of the columns is in the same direction of the axis of the movable sliding rack and any two of the neighboring hollow columns are isolated by their wall/walls;
   wherein the material container is used for ultra high pressure food processing.

2. The material container of claim 1, wherein the movable sliding rack has a cylindrical tube; and
   six specially sectioned cylindrical tubes, wherein any of said specially sectioned cylindrical tubes is comprised of
   a cylindrical tube, having an opening parallel to the axis of the cylindrical body, said cylindrical tube is located inside the moveable sliding rack, sharing the same axis, and wherein the cylindrical tube is surrounded by the said specially sectioned cylindrical tubes on the periphery, and tangent to the outer wall of the cylindrical tube, and wherein the outer walls of any of the two neighboring specially sectioned cylindrical tubes are tangent to each other.

3. The material container of claim 1, wherein the first and second end covers each has a handle for carrying.

4. The material container of claim 1, wherein the distribution density of the fluid passage holes increases from the left side of the first end cover to the right side of the first end cover, and in the second end cover, the distribution density of the fluid passage holes increases from the left side of the second end cover to the right side of the end cover, wherein water leveling at any height along the diameter direction of the cylindrical body can reach into the fluidic passage holes.

* * * * *